US012763492B2

(12) United States Patent
Branković et al.

(10) Patent No.: US 12,763,492 B2
(45) Date of Patent: Oct. 13, 2026

(54) RADAR SENSOR WITH A 180° FIELD OF VIEW

(71) Applicant: NOVELIC DOO Beograd—Zvezdara, Belgrade (RS)

(72) Inventors: Veselin Branković, Belgrade (RS); Milos Jovicic, Belgrade (RS); Nenad Simic, Belgrade (RS); Veljko Mihajlović, Belgrade (RS); Darko Tasovac, Belgrade (RS)

(73) Assignee: NOVELIC DOO BEOGRAD—ZVEZDARA, Belgrade (RS)

(*) Notice: Subject to any disclaimer, the term of this patent is extended or adjusted under 35 U.S.C. 154(b) by 204 days.

(21) Appl. No.: 18/667,770

(22) Filed: May 17, 2024

(65) Prior Publication Data

US 2025/0323427 A1 Oct. 16, 2025

(30) Foreign Application Priority Data

Apr. 12, 2024 (EP) .................................... 24169966

(51) Int. Cl.
*H01Q 21/20* (2006.01)
*G01S 13/06* (2006.01)
(Continued)

(52) U.S. Cl.
CPC ............ *H01Q 21/20* (2013.01); *G01S 13/06* (2013.01); *G01S 13/867* (2013.01);
(Continued)

(58) Field of Classification Search
CPC .... H01Q 21/20; H01Q 1/3233; H01Q 21/065; G01S 13/06; G01S 13/867; G01S 13/931
(Continued)

(56) References Cited

U.S. PATENT DOCUMENTS 5,006,857 A * 4/1991 DeHart ................ H01Q 9/0407 343/846
7,423,604 B2 * 9/2008 Nagai .................. H01Q 21/064 343/786
(Continued)

FOREIGN PATENT DOCUMENTS

CN 107526063 B 3/2021
CN 116487902 A 7/2023
(Continued)

OTHER PUBLICATIONS

Mayer et al. "Conformal Antennas for a Wide View Angle in Automotive Radar," GeMiC 2019 • Mar. 25-27, 2019, Stuttgart, Germany, pp. 119-122 (Year: 2019).*
(Continued)

*Primary Examiner* — Resha Desai
*Assistant Examiner* — Samarina Makhdoom
(74) *Attorney, Agent, or Firm* — NIXON & VANDERHYE

(57) ABSTRACT

A mmWave radar sensor module is proposed, to have a specific structure enabling a 180° field of View (FoV) with an affordable system cost. The proposed mmWave radar sensor module is put to use in passenger vehicles, commercial vehicles, automated guided vehicles (AGVs), as well as motorcycles and bikes, enabling a variety of application features: smart parking assistance, replacing PDC sensors, determining the distance, speed and angle of targets, including their tracking, detection of people, tracking of people, tailgate and door protection by restricting opening, gesture and kick sensing, and other applications. In the case of two-wheelers and three-wheelers, the same apparatus may cover also blind sport detection application in the affordable system manner.

21 Claims, 17 Drawing Sheets

(51) Int. Cl.
*G01S 13/86* (2006.01)
*G01S 13/931* (2020.01)
*H01Q 1/32* (2006.01)
*H01Q 21/06* (2006.01)

(52) U.S. Cl.
CPC ......... *G01S 13/931* (2013.01); *H01Q 1/3233* (2013.01); *H01Q 21/065* (2013.01)

(58) Field of Classification Search
USPC .......................................................... 342/359
See application file for complete search history.

(56) References Cited

U.S. PATENT DOCUMENTS

| | | | | |
|---|---|---|---|---|
| 9,520,637 | B2 | 12/2016 | Monte et al. | |
| 10,106,153 | B1 * | 10/2018 | Xiao | G06V 10/82 |
| 10,218,075 | B1 * | 2/2019 | Smith | H01Q 13/02 |
| 10,219,571 | B1 * | 3/2019 | Aloumanis | G08G 1/167 |
| 10,283,832 | B1 | 5/2019 | Chayat et al. | |
| 11,005,185 | B2 | 5/2021 | Howarth et al. | |
| 11,145,962 | B2 | 10/2021 | Kotzer et al. | |
| 11,329,398 | B2 | 5/2022 | Rojanski | |
| 11,791,542 | B2 | 10/2023 | Rieder | |
| 2011/0163904 | A1 * | 7/2011 | Alland | B60R 11/04 342/52 |
| 2013/0311075 | A1 * | 11/2013 | Tran | B60Q 1/535 701/117 |
| 2017/0047649 | A1 | 2/2017 | Himmelstoss | |
| 2019/0280365 | A1 | 9/2019 | Song et al. | |
| 2019/0302253 | A1 * | 10/2019 | Santra | G01S 7/415 |
| 2019/0369207 | A1 | 12/2019 | Sanada et al. | |
| 2021/0384613 | A1 | 12/2021 | Koul et al. | |
| 2022/0123454 | A1 | 4/2022 | Tsai | |

FOREIGN PATENT DOCUMENTS

| | | | |
|---|---|---|---|
| DE | 102013100554 | A1 | 7/2014 |
| FR | 3063150 | A1 | 8/2018 |

OTHER PUBLICATIONS

European Extended Search Report, issued in European Patent Application No. 24169966.9dated Oct. 8, 2024.

* cited by examiner a)

b)

RADAR SENSOR WITH A 180° FIELD OF VIEW

CROSS-REFERENCE TO RELATED APPLICATIONS

This application claims priority to EP 24169966.9 filed Apr. 12, 2024, the entire contents of which are hereby incorporated by reference.

TECHNICAL FIELD

The present disclosure refers to an apparatus working as mm-Wave radar sensor module.

State-of-the-Art

In the following patents conformal antennas, with radiation elements not being in one plane are outlined, for various vehicle related applications, including open waveguide applications. Those solution are not addressing practical realization of the radars sensor in affordable way specifically addressing 180° field of view.

US20210384613A1 Conformal Antenna Module With 3D-Printed Radome, introduces disclosure providing several embodiments of integrated conformal antennas that are designed to be integrated into handheld devices and support operation at millimeter-wave operating frequency band that includes 28 GHz. This solution is related to communication applications.

U.S. Pat. No. 11,145,962B2 Conformal antennas formed at a surface of a vehicle, describes the structure and method of forming the conformal antenna involve a slot formed in a portion of the surface of the vehicle.

U.S. Pat. No. 11,791,542B2 RF devices including conformal antennas and methods for manufacturing thereof, is introducing device includes a conformal RF antenna configured to be mounted on a non-metallic component of a vehicle and configured to operate at frequencies greater than 10 GHz.

U.S. Pat. No. 11,329,398B2 Conformal antenna, is introducing conformal phased array of antenna elements with electron steering.

U.S. Pat. No. 11,005,185B2 Millimeter wave conformal slot antenna, is introducing system and method for a conformal millimeter wave (mmW) cavity backed slot antenna.

US20190280365A1 Vehicle integrated antenna with enhanced beam steering, is introducing antennas embedded in or on glass structures.

CN107526063B Radar apparatus and method of processing radar signals, is introducing radar apparatus and a method of processing signals using the same, and more particularly, to an apparatus and a method of receiving and processing received signals having different polarization characteristics using one array antenna.

WO US U.S. Pat. No. 9,520,637B2 Agile diverse polarization multi-frequency band antenna feed, is introducing A compact, agile polarization diversity, multiple frequency band antenna with integrated electronics for terrestrial terminal use in satellite communications CN CN116487902A Dual-polarized open waveguide array antenna capable of realizing wide-angle deflection WO US JP U.S. Ser. No. 10/283,832B1 Cavity backed slot antenna with in-cavity resonators, introducing A compact wideband RF antenna for incorporating into a planar substrate, such as a PCB, having at least one cavity with a radiating slot, and at least one transmission line resonator disposed within a cavity and coupled thereto

SUMMARY

The basic motivation for the invention is to provide a new generation of 180° field of view (FoV) radar vehicle sensors, which may be produced in an affordable way, by maintaining sufficiently good performance for matching vehicle sensing requirements. Due to the nature of the contactless sensing with the state-of-the-art usage of planar antennas, the typical field of view with for a single integrated circuit is about 120 FoV degrees. Due to the fact that some applications require a 180° field of view, radar sensor modules are typically equipped with two PCBs arranged in such a way that each of them covers a 120° field of view, thus overlapping and covering 180 degrees with two mmWave radar integrated circuits, as shown in FIG. 4*a*. The proposed innovative solution enables usage of a single chip covering 180° foV, as shown in FIG. 4*b*, making the whole system less expensive, with potentially lower power consumption. Two different realization approaches using this innovative proposal are outlined: one using conformal planar antennas, and one using specially arranged open waveguides as radiation elements. In both cases, in contrast to the state-of-the-art automotive radar sensors in the field, special arrangements of the receiving and transmitting radiation elements are introduced, by placing transmission elements in the middle of the main curves and receiving elements symmetrically on one and other side of the convex "main curve" 205.

The apparatus working as a mmWave radar sensor module, comprising mmWave integrated radar circuit entity having at least four receiving inputs and at least two transmitting outputs is proposed with a specific antenna structure being placed on the convex surfaces. The antenna structure has at least four radiation elements receiving mmWave signals and at least two radiation elements transmitting mmWave signals, where all radiation elements are connected by mmWave electromagnetic transmission guides to the integrated mmWave integrated radar circuit entity. The middle points of radiation surfaces of the said radiation elements are building symmetrical convex arrangement toward observation area, named "main curve", where said radiation elements are transmitting mmWave signals are arranged on the "main curve" in the middle of the main curve in symmetrical order. Depending of the even or odd number of the radiation elements transmitting mmWave signals, they are placed symmetrically to the "main curve" in the middle part of the "main curve" and close to the receiving radiation elements, which are on placed on left and right side symmetrically of the main curve. That means looking from one side of the "main curve) building convex line, we have in symmetrical order, receiving radiation parts (at least two) that transmitting radiation part at least (two), and then, again, receiving radiation parts (at least two). Advantageously to have the best performance with a minimum cost following arrangement is proposed: 4 RX X 4 Tx, to be served by simple integrated radar chips. Alternatively, 4Tx 8Rx and 8Tx 8Rx integrated chips are used, by introducing better angular accuracy on the expense of more silicon area and higher system cost. Radiation structures can be printed antenna strings, having at least one patch antenna on the single bent substrate. Radiation structures can be open waveguides, realized as rectangular waveguides, ellipsoidal or circular waveguides. Proposed apparatus can be used for applications addressing advantageously passenger vehicles to replace PDC sensors in efficient way, providing single sensor solution per one side of the vehicle, instead of two, three, four, or even six sensor, having minimum detection range larger than 15 cm, maximum range less than 10m, being unviable and offering extra features, with less harnessing and maintains efforts.

DETAILED DESCRIPTION OF THE INVENTION

Figure 1:
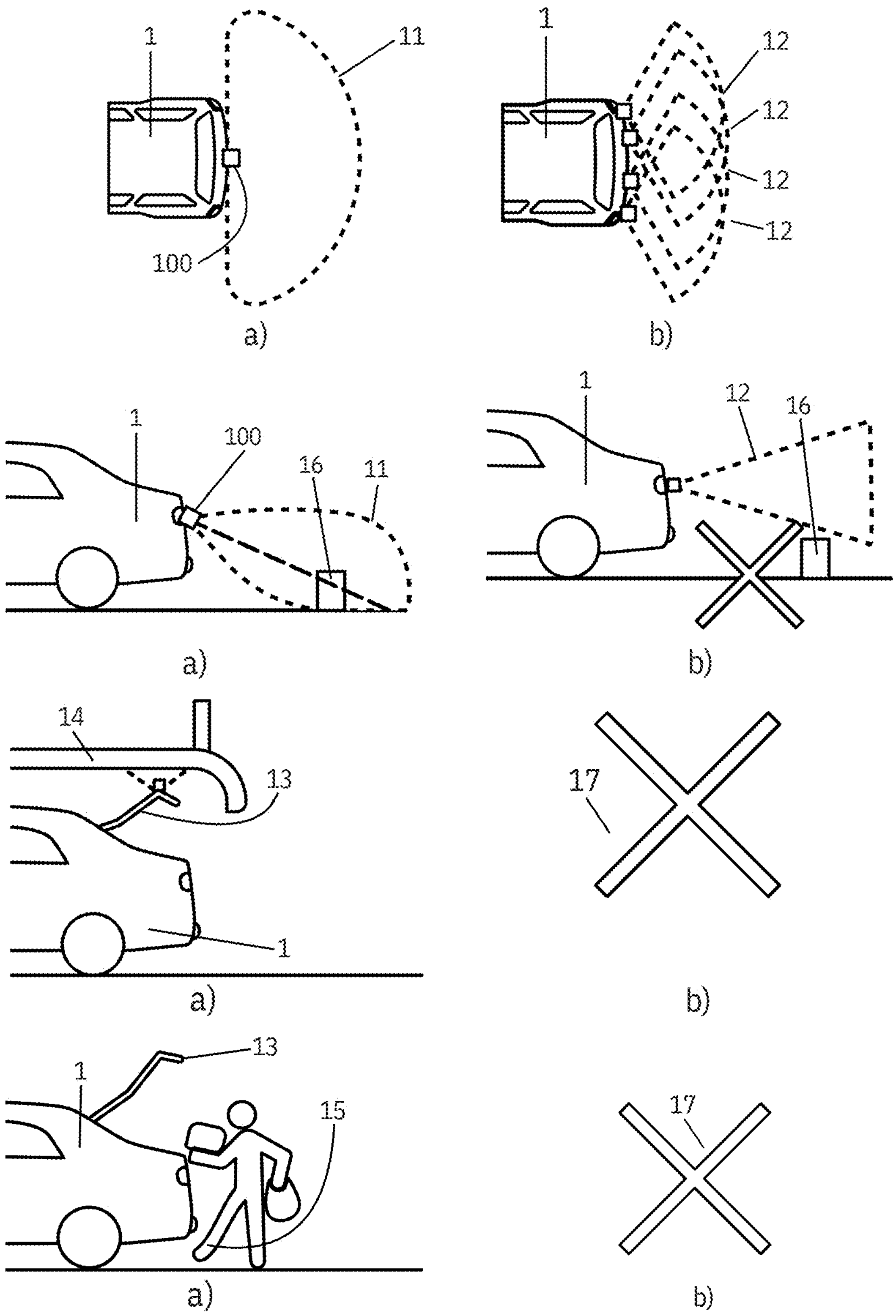
FIG. 1 shows application scenarios related to passenger vehicles: Proposed Invention compared to state-of-the-art PDC systems.

The proposed apparatus 100 can be used as a radar parking sensor, replacing the widely used ultrasonic sensors 12 mounted on passenger vehicles 1 like shown in FIG. 1*a* and FIG. 1*b*. The proposed apparatus 100 has a 180° field of view (FoV), so that one side of the vehicle can be covered by single apparatus. The proposed apparatus 100 regarding applications shown in FIG. 1, can detect objects at distances shorter than 5 cm, and farther than 15 meters or 30 meters (depending of realization option). In addition, it can detect low-height objects, multiple targets as well as their distance, speed and angles, with a field of view of 180 degrees. The same hardware can support integrated kick & gesture sensor functionalities, as well as full software processing in the same hardware module. The state-of-the-art solution needs several (more than two, typically four) proximity distance sensors based on ultrasonic technology to get the same angle of detection. It is obvious that on the side of the vehicle, more than two sensors 12 are needed, due to their small field of view. Moreover, ultrasonic sensors 12 are externally visible, which OEMs do not prefer, due to the design sticking out. Sensors 12 cannot reliably detect obstacles below 15 cm and cannot reliably detect obstacles above 8m. In the case of damage to the bumper, the replacement of the sensors increases maintenance costs. Ultrasonic sensors 12 can hardly detect low-height objects 16 and cannot include kick and gesture sensor functionality, in contrast to the proposed apparatus 100. The radiation diagram 11 of the proposed apparatus 100 observes an area with inclination, in contrast to ultrasound sensor 12 having no inclination, no steering capability in elevation and no ability to detect low-height objects 16. Ultrasonic sensors 12 require an additional hardware unit for processing several sensors, and as a system, requires much more harness as proposed apparatus 100. In the case of bumper damage, extra handling of PDC sensors 12 is required, which imposes large maintenance costs. Due to the specific innovative solutions of the apparatus 100, the total system cost is affordable compared to using PDC sensors on the entire vehicle, taking into account the better performance and the versatility of new features.

FIG. 2*a*) shows an application scenario where the proposed apparatus 100 is used as a lateral sensor, placed on a truck's 2 side, with the radiation diagram 22, and as a rear sensor placed onto the back of the truck, with a 180° FoV 21. The lateral arrangement allows combined blind spot detection and parallel lane traffic observation features, while the rear arrangement enables perception for detecting obstacles while driving in reverse, detecting the movement and position of people behind the vehicle, as well as optional guided coupling and guiding for tracks 2. FIG. 2*b*) shows an application scenario where the proposed apparatus 100 is used on all sides of an autonomous guided vehicle (AGV) 3, having the radiation diagram 31 with a 180° field of view. This arrangement of four units of the proposed apparatus 100 on an AGV 3 enables a 360° view around the vehicle. In the corners of the AGV 3, radiation diagrams 31 are overlapping, providing detection redundancy in those areas, where the detection accuracy in distance values and in angle values is physically lower, thus bringing performance improvements to the system, as the target is measured by two different perpendicular proposed apparatuses 100, so that the AGV 3 system has two measurements from two sources, which can then compensate for inaccuracies of measuring objects in large angles in relation to the particular proposed apparatus 100. The same arrangement is used to provide 360° coverage for passenger vehicles 1, as well as commercial vehicles or trucks 2. FIG. 3*a* shows the proposed apparatus 100 attached to a two-wheeler vehicle: motorcycle or bike 4 in the rear arrangement. The radiation diagram 41 has a 180° FoV. It may be observed that proposed apparatus 100 has an inclination towards the ground and the main radiation diagram 41 is not symmetrical to the ground surface. This allows for better observation of low-height objects, and it is also advantageous when the proposed apparatus 100 is used for rear and front applications for passenger vehicles 1, for commercial vehicles 2, and for taller AGVs 3. The proposed apparatus 100 has an integrated wireless entity, allowing for wireless communication 46 by arbitrary wireless protocols and frequency means to the rider's helmet 42, the rider's airbag 43 and to the two-wheeler's rear-view mirrors 45. Rear-view mirrors 45 have optical display functionality 47. Arbitrary wireless protocols can be short range communication systems like Bluetooth and WiFi, working in non-licensed frequency bands in the 2.5 Ghz and 5 GHz ranges. The proposed apparatus 100 enables more safety for the rider: enabling acoustic and visual traffic alerts to the helmet, where the rider may hear an alarm or see a warning displayed on the glass portion on helmet 42. The rider's airbag 43 can be proactively inflated before an actual crash happens, due to the apparatus 100 warning it about the crash beforehand, which is state-of-the-art today. On the other side, the apparatus 100 can make use of its 180° observation diagram 41 and its ability to track moving targets to calculate if a vehicle will enter from a blind spot, and communicate the situation by wireless means 46 to the rear mirror 45. The rear-view mirror 45 has display optical functionality 47, which can indicate to the rider the proximity of the vehicle coming from the blind spot. One realization option is that of an entity 47 with several segments lit up with strong colors, preferably red, which are filled with said color depending on the distance, which is easily understandable to the rider. For example, when the vehicle is at the closest distance, all segments are filled in, and fewer are filled the larger the blind spot distance is to the two-wheeler 4.

Figure 2:
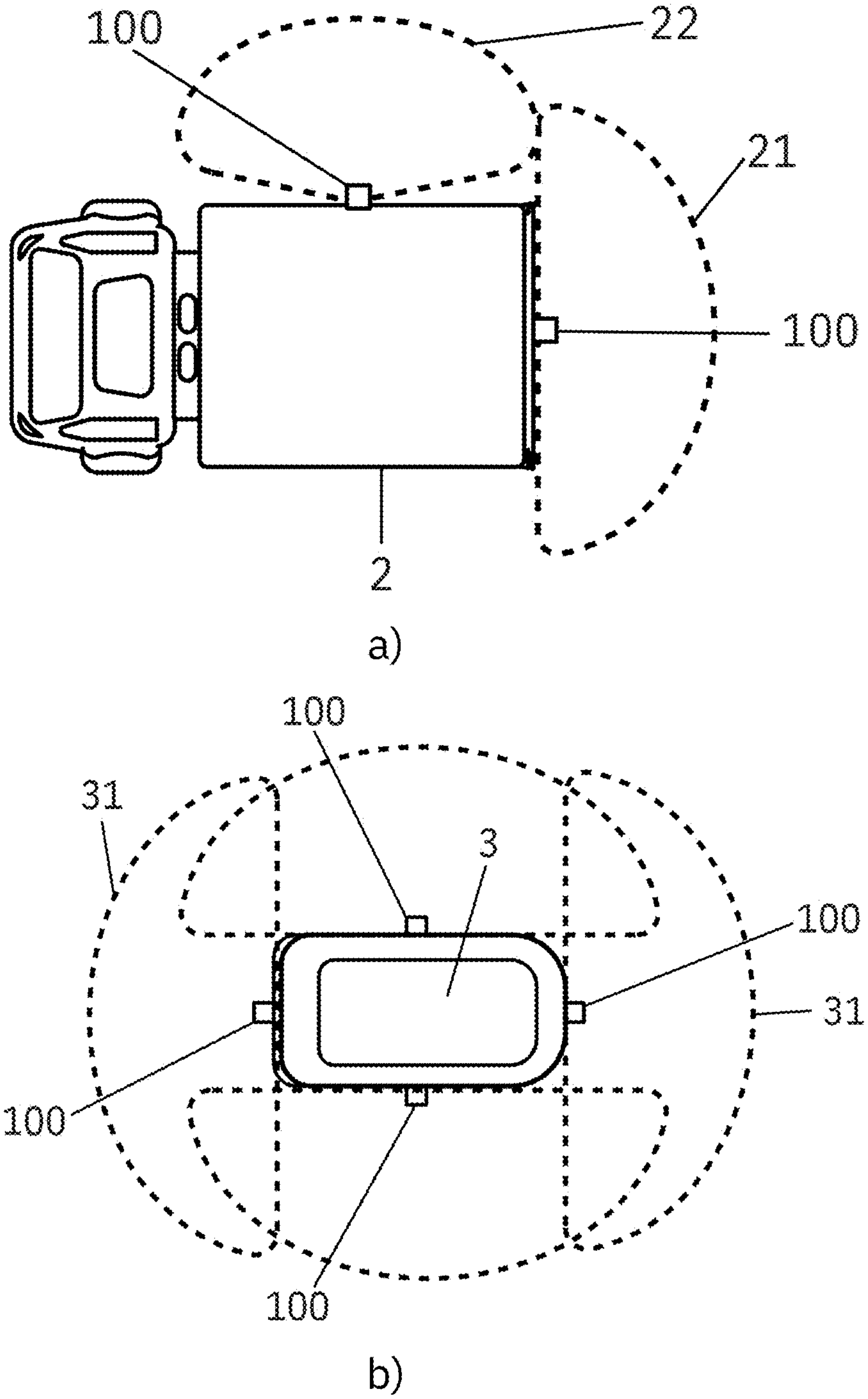
FIG. 2 shows application scenarios related to commercial vehicles and autonomous guided vehicles (AGVs).
Figure 3:
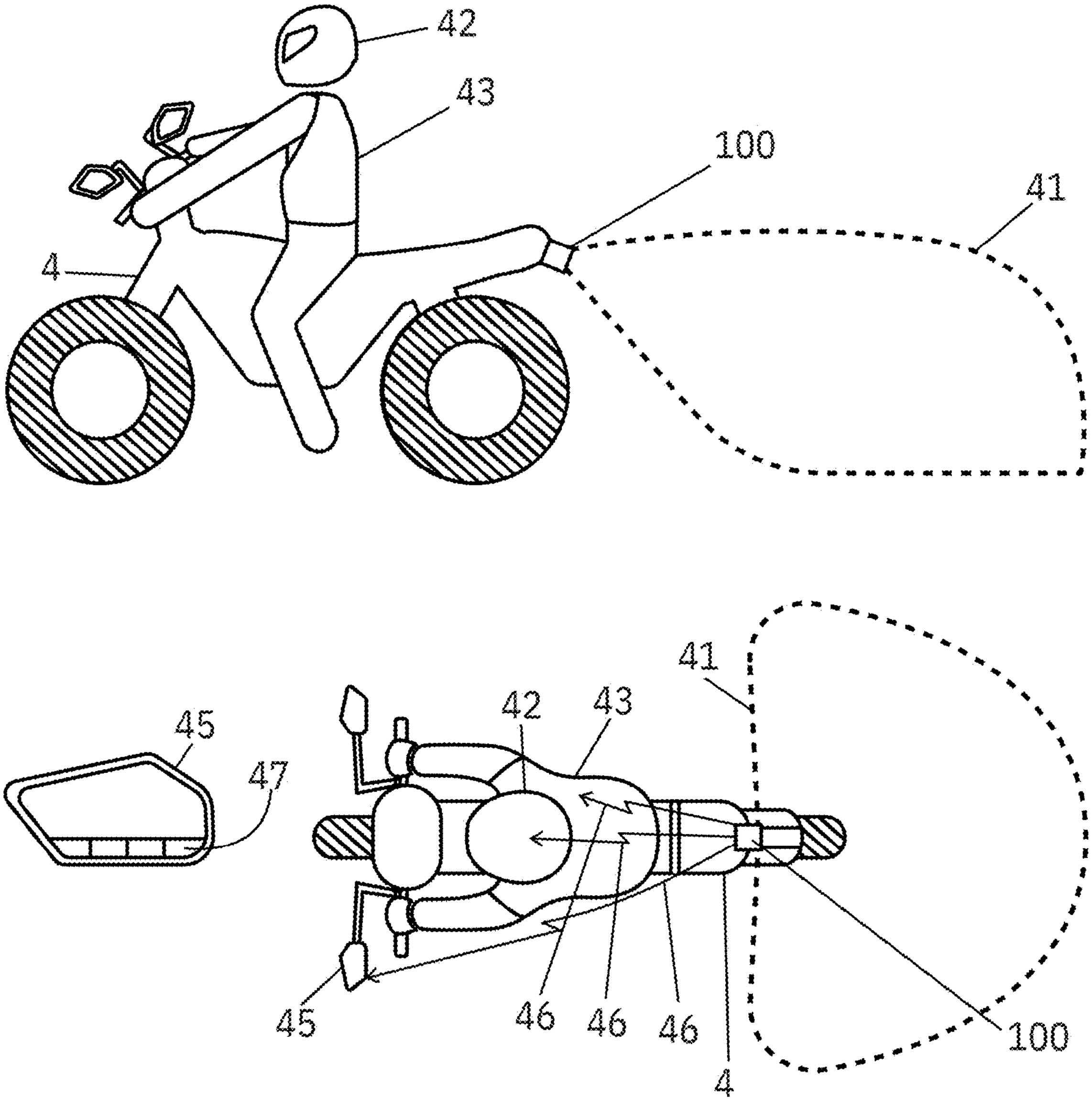
FIG. 3 shows application scenarios related to 2-wheelers.
Figure 4:
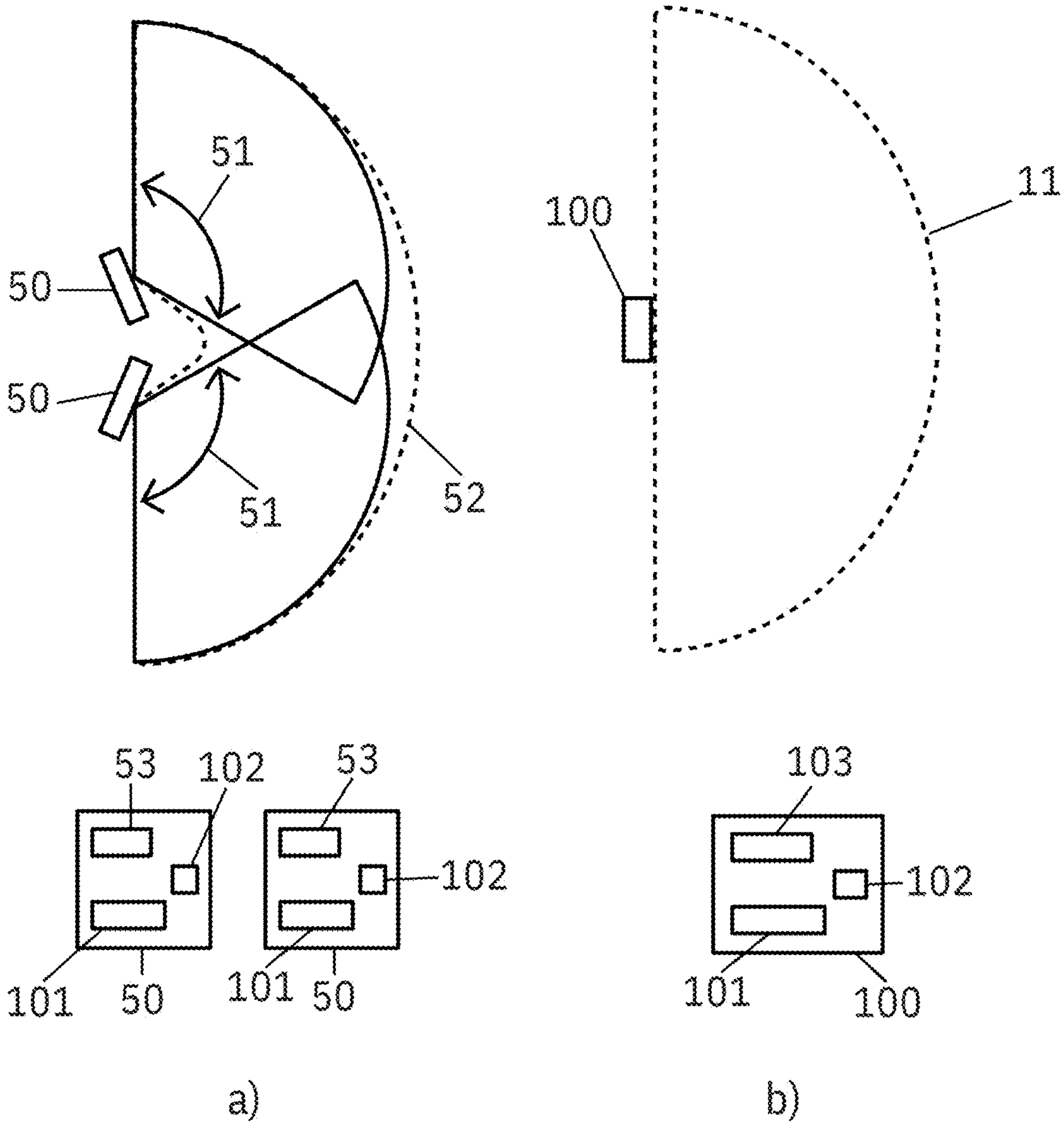
FIG. 4 shows State-of-the-art 180° FoV realization versus proposed invention.

In all application scenarios described in FIG. 1, FIG. 2 and FIG. 3, the proposed apparatus 100 has its basic operation mode as state-of-the-art mmWave radar sensor, which includes detecting distance and angle to the target, thus determining the position of the target. For each target, we have information about relative speed to the apparatus 100. A target can be point-cloud information, as well as tangible objects. The proposed apparatus 100 can additionally have a processing sub-system enabling following features, aside from the aforementioned state-of-the-art features: target tracking, target classification, as well as the ability to provide tailgate or door protection for vehicles (as described in FIG. 1), when opening the tailgate or trunk in a low-height garage, or opening the doors, as well as the ability to recognize a kick movement towards the proposed apparatus 100 or a gesture in front of the proposed apparatus 100. Kick sensing is calculated by proposed apparatus as a time-limited, characterized movement with specific dynamic borders, where the distance from the leg to the proposed apparatus 100 is changing in a predefined time frame. Gesture sensing is calculated in a specific time frame, as the specific dynamic of the target is calculated by taking different angular positions and distances to the proposed apparatus 100, where the target is the hand of the user. Door and tailgate protection sensing functions are defined by measuring the distance to the target, in cases where the proposed apparatus 100 is integrated in the vehicle part 1, 2, 3, which move when opened. The proposed apparatus's 100 calculation assures that the critical minimum distance, endangering the tailgate or doors when opened, is not reached, sending an alert to stop the related movement. The proposed apparatus 100 in the case of application scenario in FIG. 4. is calculating and predicting the position of the targets coming from the blind spots of the two-wheeler vehicle 4. The proposed apparatus 100 has processing features that enable classification of the targets, by processing sets of information related to the targets, such as the intensity of the reflected wave, imposed by the Radar Cross Section (RCS) value, the speed of the target, as well as the micro-vibration of the targets. For example, specific RCS value ranges with micro-vibrations may be classified as humans. Additionally, information relating to different targets can be processed by artificial intelligence (AI) algorithms, processing within the proposed apparatus 100. All of the calculation features of the apparatus 100 are executed in the proposed apparatus 100, by apparatus' 100 processing sub-system. The proposed apparatus 100 has a 180° field of view, which is essential to execute operations in the described application scenarios, described in FIG. 1, FIG. 2 and FIG. 3. The main advantage of the proposed apparatus 100 may be observed in FIG. 4. FIG. 4 a) shows state-of-the-art sensing topology with a 180° field of view 100 and FIG. 4 b) shows the field of view achieved by the proposed apparatus 100. The state-of-the-art sensing topology of FIG. 4*a* is achieved by using one hardware module comprising of basically two separate state-of-the-art radar sensing entities 50, each having overlapping 120° foVs, to get the total desired 180° foV. On other side in FIG. 4*b*, the proposed apparatus 100 can achieve the 180° FoV directly. The apparatuses 50 and apparatus 100 both have antenna systems 102 and digital functionalities (101). In FIG. 4 a) the system generally has two RF functionalities 53, two antenna systems 102 for 180° field of view, and two digital functionalities 101. On the other side, the proposed apparatus 100 only requires one set of of each. Therefore, the main advantage of the proposed apparatus 100 is fewer electronics and an inherently lower system cost compared to the state-of-the-art of FIG. 4. a). Typically, the state-of-the-art FIG. 4 a) solution has printed antennas on two PCBs.

Figure 5:
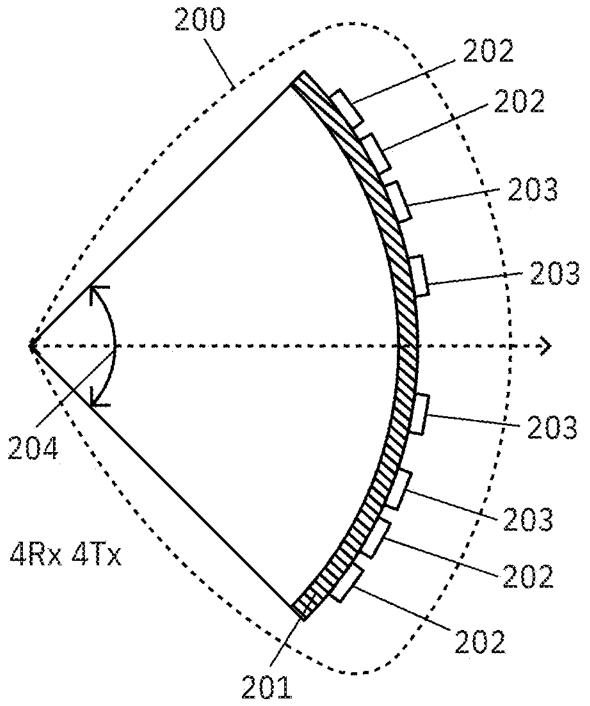
FIG. 5 shows a radiation element arrangement with "main curve" arrangement with patches.
Figure 5:
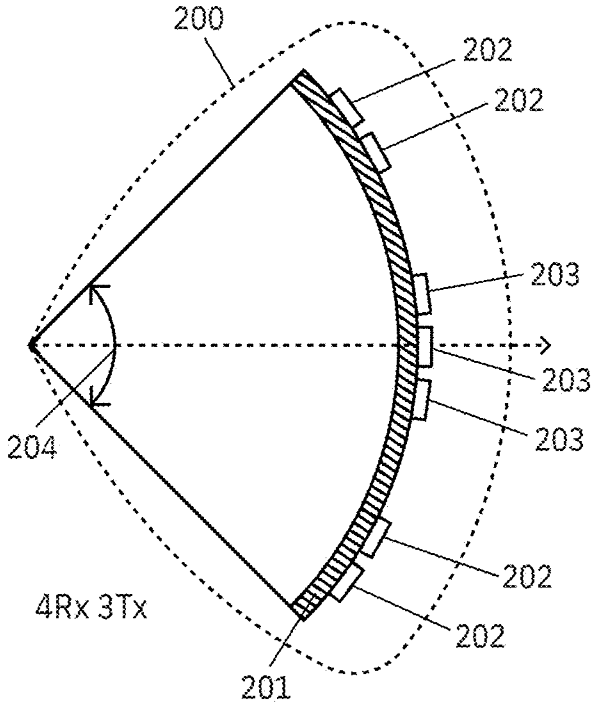

FIG. 5*a* and FIG. 5*b* are showing two variants of the proposed apparatus 100. The proposed apparatus 100 has dielectric substrate 201 which is bent in a way that in each plane, like in FIG. 5*a* and FIG. 5*b*, the angle 204 is realized as a base for substrate bending, along the virtual circle part, being defined by the angle 204 and the same symmetrical radius of the circle. On the bent substrate 201, we have symmetrically positioned 4 antenna systems dedicated to the mmWave transmitting 203 and 4 antenna systems dedicated to the mmWave receiving 202, two on side of the substrate and two on the other side of the substrate. This topology of the arrangement of the transmitting and receiving antenna systems on the dielectric substrate 201, from one side to another side of the dielectric substrate two receiving antenna systems 202, followed by the four transmitting antenna systems 203 and again two receiving antenna systems 202, is innovatively proposed as the unique part and innovation of the proposed apparatus 100. The state-of-the-art arrangement of the receiving and transmitting antenna system for radar sensors is that all transmitting parts are grouped on one side, and the receiving antenna systems are grouped together on the other side of the substrate, for the connection to the single integrated mmWave circuit. The basics of the proposed apparatus 100 is to use single integrated mmWave circuit having four transmitter and four receivers with the arrangement like in FIG. 5*a*, or single integrated mmWave circuit having three transmitter and four receivers, with the antenna system arrangement like in FIG. 5*b*. By bending the substrate 201, the proposed apparatus 100 works with a wider field of view (FoV), whereas state-of-the-art non-substrate-bent radar system can achieve FoV of 120° to 150°, the proposed apparatus 100 is achieving FoV over 180°. FoV is defined as an angle in one plane, where the antenna system radiation diagram is drops for a specific number of decibels, and in terms of the radar sensor system as an angle where the full projected operation of the radar sensor as a system is guaranteed. Achieving a 180° foV and operation of the radar sensor with single integrated radar chip is crucial due to requirement of having the smallest system cost possible. A state-of-the-art radar solution would need to have two mmWave chips to cover the required 180° of operation, two dielectric substrate parts and two sets of the antenna systems. In the state-of-the-art, common solution, dielectric substrates are not bent. The lowest system cost is achieved by using the mmWave integrated chip with the smallest cost, and the topologies of three transmitters or two transmitters being combined with four receivers are used. FIG. 5*b* shows the antenna system arrangement with three transmitter antenna systems 203 and four receiving antenna systems 202. In that case, one of the transmitter antenna systems is placed in the line of symmetry, in the middle of the bent dielectric substrate 201. Depending of the intended utilization of the mmWave radar chip, in the proposed apparatus 100, it is possible to have an even or odd number of transmitter antenna structures with even number of receiving structures, where the arrangements are made for the transmitting and receiving antenna systems, like in FIG. 5*a* or like in FIG. 5*b*, respectively. Additionally, to achieve the minimum system cost of the proposed apparatus 100, with sufficient performance, integrated radar chips with four transmitters and four receivers are recommended. The proposed apparatus 100 will have better angular resolution by utilizing an integrated mmWave chip with eight transmitters and eight receivers, with the drawback of a larger system side to accommodate the additional receiver and transmitter antenna systems, which in turn might make the proposed apparatus 100 more difficult to integrate in the vehicle or in the respective integration environment. Such a configuration would additionally be more expensive as a solution, due to the need for a more expensive integrated mmWave chip, and more materials used. The proposed apparatus 100 is using, advantageously, an integrated mmWave radar chip operation in the automotive frequency band: 77-81 GHz for moving vehicles, and 57-64 GHz non-licensed & and ISM band for fixed apparatus 100 installations.

Figure 10:
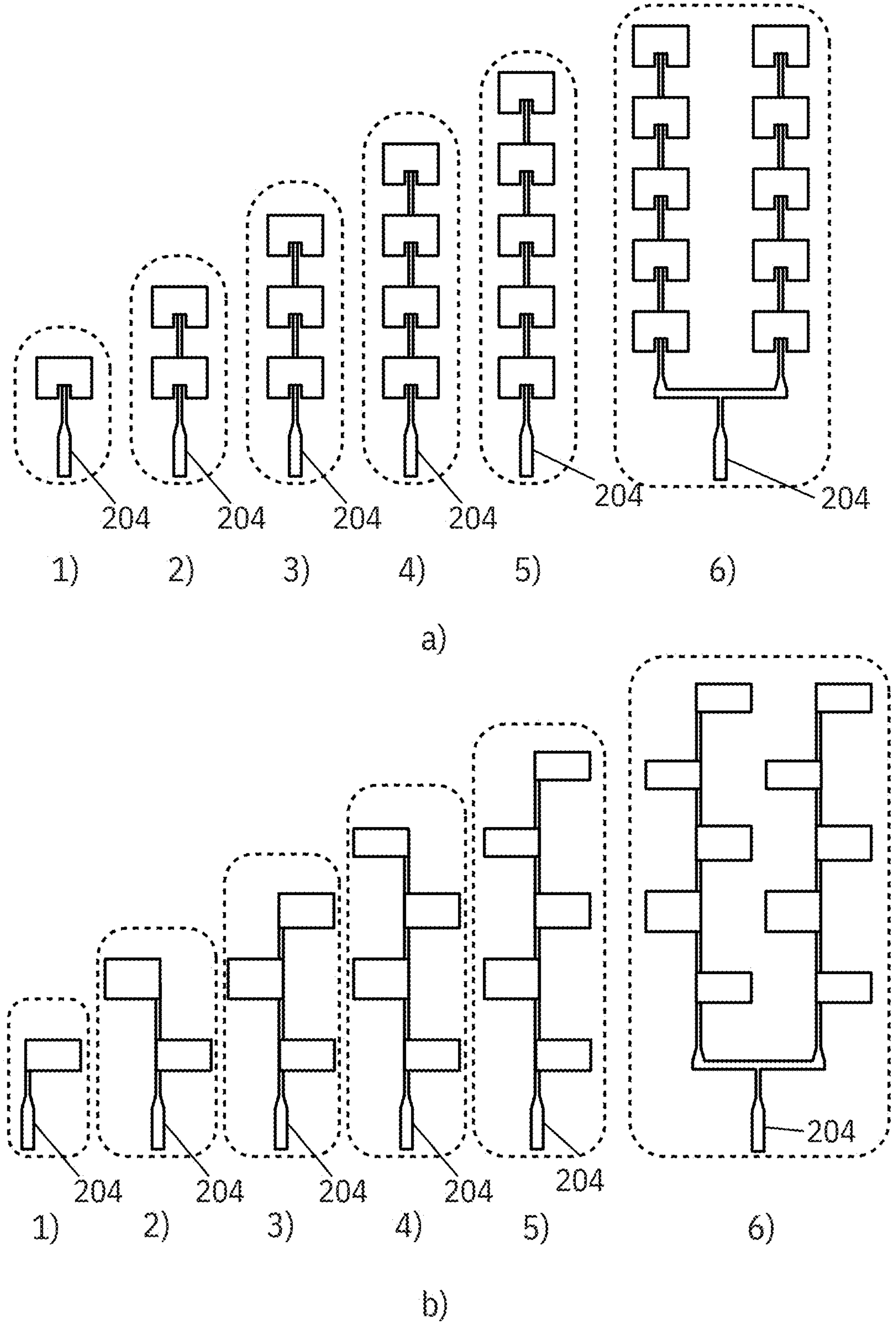
FIG. 10 shows printed antenna realization options for receiving and transmitting antenna systems, being part of the proposed apparatus.

FIG. 10 shows receiving and transmitting antenna systems 202 and 203, being realized as printed antenna systems on the dielectric substrate 201. Depending on the final applications of the proposed apparatus 100, receiving and transmitting antenna systems 202 and 203 being realized as printed antenna strings of patch antennas, with microstrip realized feeding lines, with arbitrary realization options of the patch shape and patch feeding, have a number of patches which is one and more than one in each string. In the case that the string contains only one patch, the complete size of the required dielectric substrate 201 is small, which means that the size of the proposed apparatus 100 can be further reduced, enabling easier integration. If by, default definition, the azimuth is related to 180° foV, the complete radiation angle in elevation will be larger, and the radar's maximum sensing range will be smaller. By increasing the number of patches, larger ranges, combined with lower observation angle in elevation (and simultaneously larger size) can be achieved. For practical realizations targeting short range applications, such as parking assistance, the total number of patches in one string is equal or smaller than 3. If the proposed apparatus 100 is to be integrated into a vehicle's door handle, for applications such as door protection by opening, or gesture sensing, one patch antenna system for both receiving and transmitting antenna systems 202, 203 is needed. If a 180° foV is to be achieved, blind spot detection in high-speed vehicle application scenarios, the number of the radiation elements in the printed antenna strings would need to be increased, in order to increase the detection range. Instead of using patched antennas for antenna strings, different distributed radiation elements may be used; different size of the patches in the strings placed in the middle, patches of irregular sizes and distances being placed on one and other side of the main feeding microstrip line, as well as plurality of the dipoles structures being fed by the coplanar lines or symmetrical microstrip lines.

Figure 6:
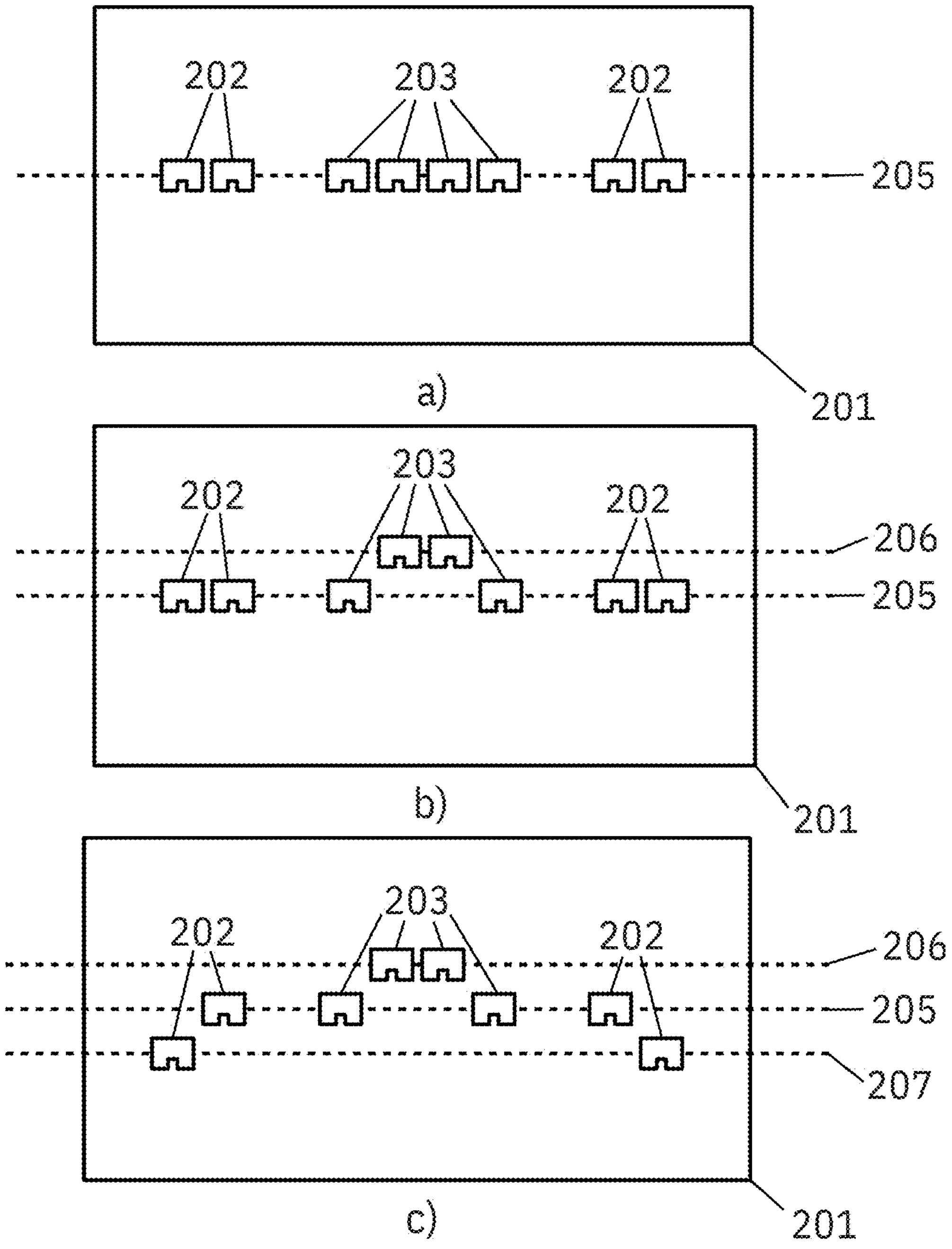
FIG. 6 shows a radiation element arrangement with "main curve", "secondary curve" and "tertial curve" arrangement with patches.

FIG. 6 shows the radiation element arrangement with main curve 205, secondary curve 206 and tertial curve 207 arrangement with patches, those curves are shown in show on the pictures with their projection. In FIG. 6 a), the arrangement of the transmitting and receiving antenna systems 203 and 204 are done in such a way that they are positioned in one curve named "the main curve" 205. This arrangement allows the best angular detection in azimuth, without the ability to measure elevation. In FIG. 6*b*), two transmitting radiation systems are placed in the secondary curve 206 above the main curve 205, which allows for scanning of the resulting antenna beams in the elevation. In FIG. 6*c*), two transmitting radiation systems are placed in the secondary curve 206 above the main curve 205, and two receiving radiation systems are placed on the tertial curve 207 below the main curve 205. This arrangement enables better elevation scanning capabilities, compared to the case of FIG. 6 b), by trading in more angular resolution in azimuth compared to FIG. 6 b). In all arrangements in FIG. 6, the arrangements are general patches representing transmitting and receiving antenna system positions in the arrangement, for the sake of simplicity. Receiving and transmitting antenna systems 202, 203 can be realized in a plurality of options, being strings of patches like in FIG. 10, or other distributed printed radiation structures or arbitrary shapes, or even open waveguide structures like in FIG. 7 and FIG. 8.

Figure 7:
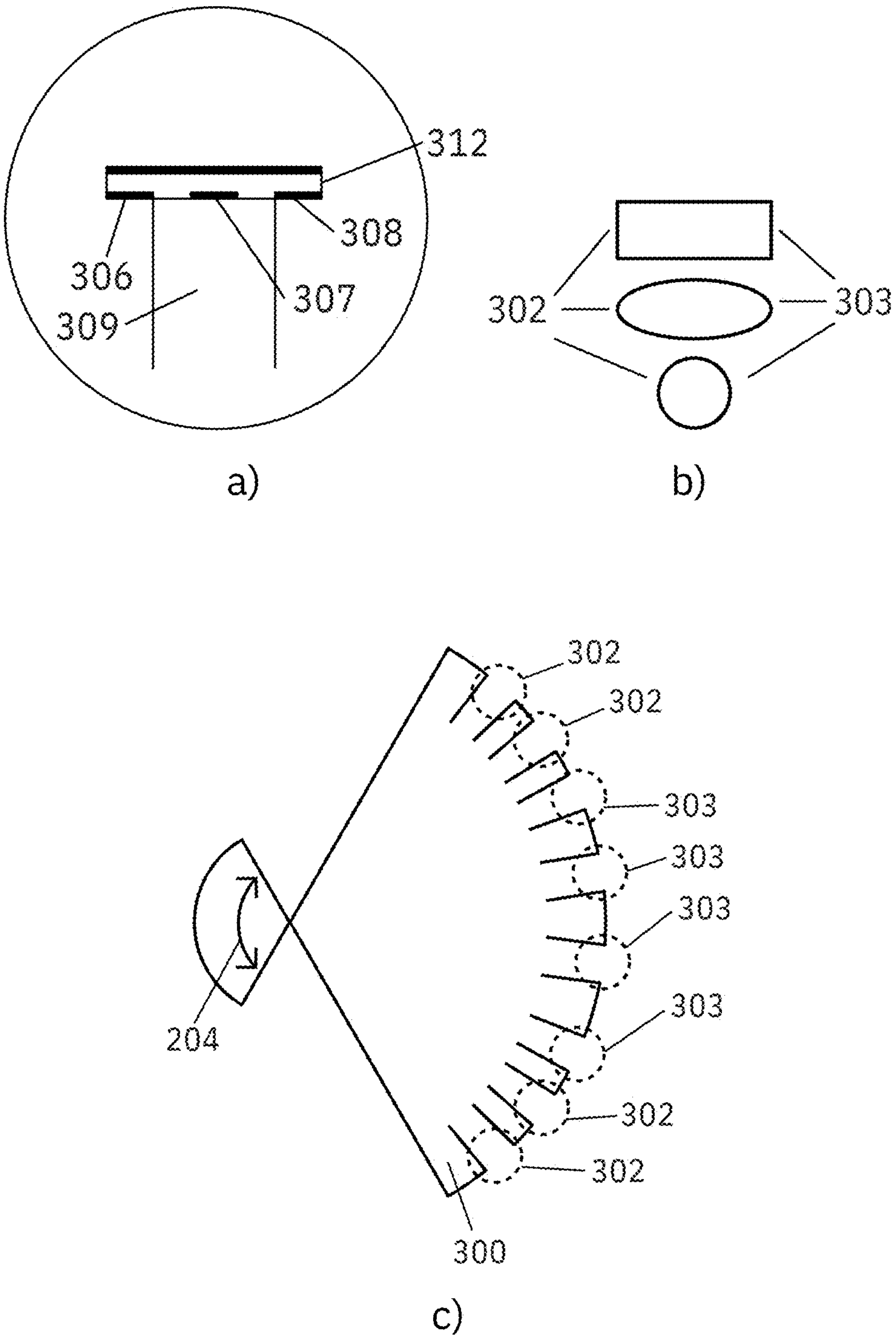
FIG. 7 shows a radiation element arrangement with "main curve" arrangement with mmWave waveguides.

FIG. 7 c) shows the arrangement of the radiation elements in the aforementioned main curve 205, where transmitting antenna systems and receiving antenna systems are realized through open waveguide structures 303 and 302 respectively. Open waveguide radiation structures can be realized through several options, like in FIG. 7. b), where rectangular waveguide structures, ellipsoidal open waveguide structures and circular open waveguide structures are shown. Open waveguide radiation structures of FIG. 7 b) are fed by the same waveguide structures 309 as open waveguide ends. At the end of the feeding structure, planar excitation elements are 307 used, preferably printed on the dielectric substrate 312, having mentalizations presented as bold parts, being electrically attached to the waveguide feed structure's 309 conducting walls.

Figure 8:
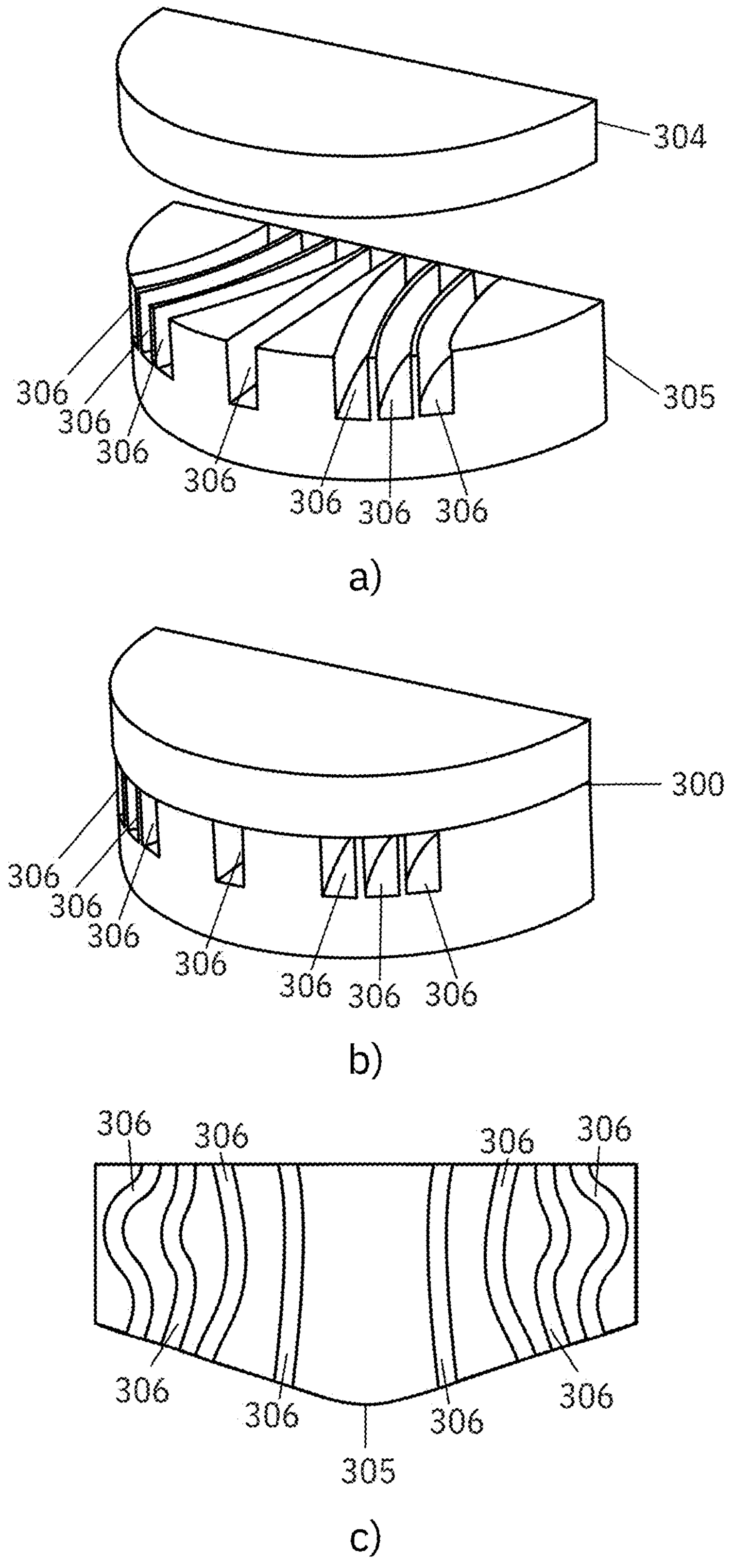
FIG. 8 shows details of open waveguide-based radiation arrangement feeding network option.

FIG. 8 shows one practical realization option of the arrangement, with FIG. 7 c) being the rectangular waveguides approach. In this realization option, shown in FIG. 8 a) the practical realization approach option, or radiation and feeding part 300, of the apparatus 100, is shown. The cap part 304 and guiding part 305 practical waveguide feeding structuring for open waveguide radiation elements. Observing the guiding part 305 from the top, the feeding structures are visible 306.

Waveguide feeding structures 306 are preferably realized in the way that their electrical length is adjusted to have the same phase difference in the electromagnetic propagation by reaching radiation point by open waveguide structure. This is achieved by meandering the feeding guides lengths, like shown in in FIG. 8 c). This arrangement allows to have in-phase excitation of each antenna system by planar printed approach of the FIG. 7 a). The complete radiation element 300 can be realized with different realization options: by metal handling, by light materials like aluminum and magnesium, or by metalized plastic, to provide conductivity of the waveguide walls.

Figure 9:
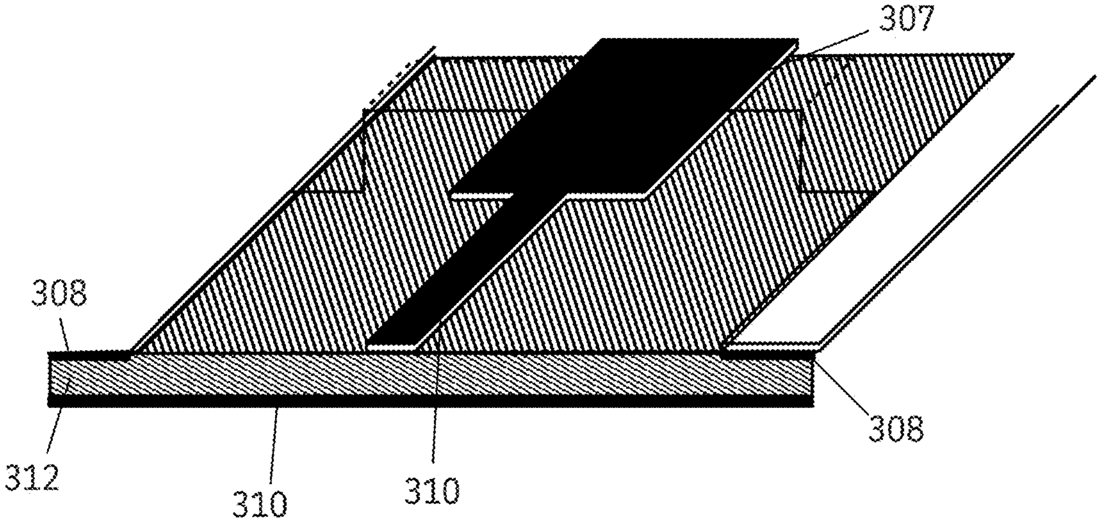
FIG. 9 shows feeding network excitation option for open waveguide-based radiation arrangement.
Figure 11:
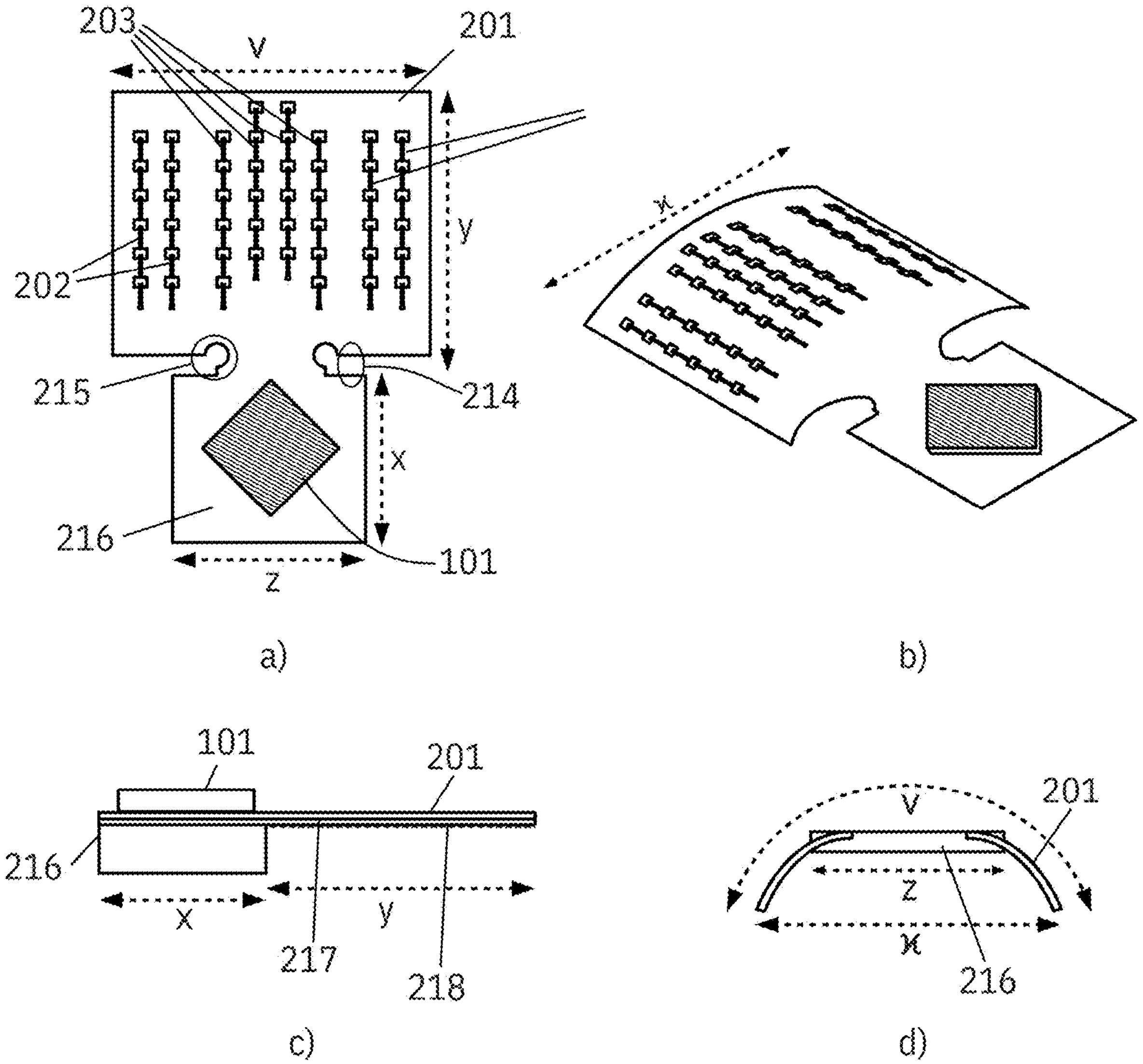
FIG. 11 shows a bent substrate realization option with bent printed circuit board (PCB).
Figure 16:
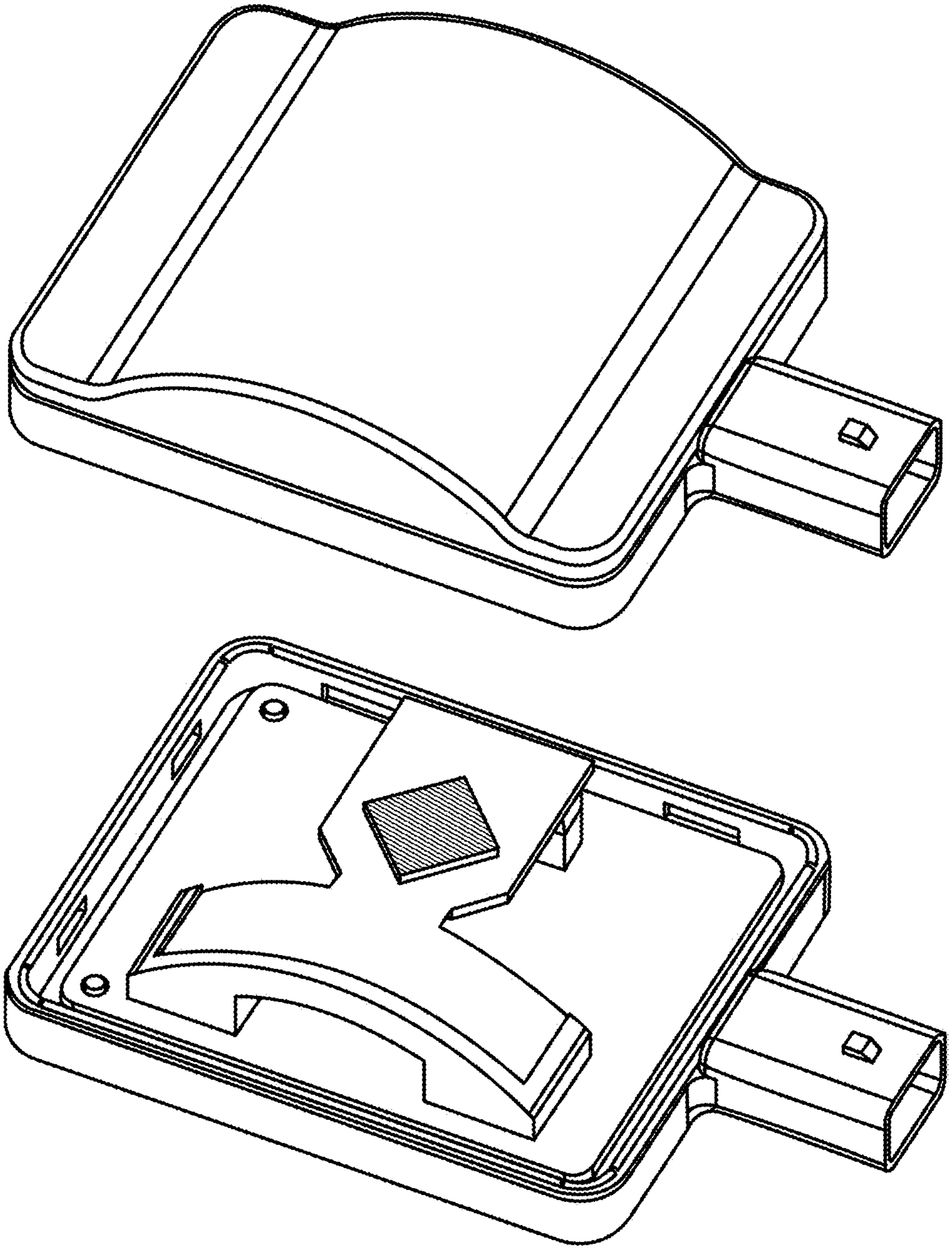
FIG. 16 shows a realization option of the mechanical enclosure for proposed apparatus.

FIG. 9 shows the details of a possible realization option of FIG. 7*a*. The dielectric substrate 312 has a printed patch 307 positioned in the middle of the feeding waveguide structure 309. Metallization parts 308 are electrically connected to the waveguide walls, being previously connected to the microstrip ground line 310. Behind the excitation patch 307, the waveguide is cut short at about one quarter of the operation wavelength, to ensure good matching of the waveguide excitation part, which means that the excitation power over the microstrip line is transmitted with small losses to the waveguide, which further transmit RF power to the open waveguide transmitting antenna structure 303. The same mechanical structure can be used to receive RF power from the waveguide feeding structure 309, coming from waveguide receiving antenna structure 302 over the patch 307 to the microstrip line 310, and further to the mmWave chip's receiver interface pad. In other realization options, in place of the microstrip feeding lines 310 coplanar waveguide lines can be used, and patch 307 can be realized as a dipole with arbitrary planar printed shapes of dipoles, or a simple metal road antenna coming out from odd mode exertion of the planar/coplanar waveguide. FIG. 11 shows one of the practical realizations, related to the main functional parts of the proposed apparatus 100. FIG. 11 contains a soft dielectric substrate 201 which can be bent, containing transmitting and receiving antenna systems 203 and 202. Soft dielectric substrate 201 is cut in such a way that the part containing printed radio elements can be easily bent, by using plastic mechanical structure described in the FIG. 12. The second part of the substrates 216 is not bent, and it is thicker, containing ridged dielectric substrate below the layer of the soft dielectric substrate 201. The cutting of the soft dielectric substrate 214 and the edge cut 215 enable minimization of the torsion effect on the thin soft dielectric substrate 201 by bending. This results in the first part of the soft dielectric substrate 201 being bent, while the second part of the dielectric substrate 216 is flat, ridged, thicker and is not bent. The arc and the length of lateral cut being imposed by soft dielectric substrate 201 is enabling bending it to flat part of the substrate transition, which is physically shorter than if the lateral cut were not to be introduced. In the proposed apparatus 100, the integrated mmWave operated chip 101 needs to be connected to the radiation elements. For the sake of the lowest possible cost of the proposed apparatus 100 and allowing sufficiently good performance, a mmWave operated chip 101 with 4 transmitter and 4 receiver paths is used. That means that mmWave operated chip 101 ports need to be connected to the soft substrate 201, which is bent. The mmWave operated chip 101 itself requires a multi-layer PCB. In the process of the PCB manufacturing, different layers of substrate are initially used, and the part marked with "Y" on the FIG. 11*c*) shows the area where the thick substrate is removed; the rough area 218 shows the rest of the thicker area after the removal process. Through the PCB manufacturing process, below the soft dielectric substrate 201 on the printed antenna system and microstrip feeding lines, an advantageously thin additional protection layer 218 is used, which is also bendable. Such a soft dielectric area has a thickness equal to or smaller than 0.127 mm. In FIG. 11, for the sake of simplicity, the proposed concept realization feeding lines to antenna systems 202 and 203 are omitted. FIG. 16 d) is showing the proposed structure, after the bending of the antenna parts is concluded. It is obvious that in order for an arrangement to achieve the target field of view of 180°, the antenna systems on the soft substrate edge need to have an unobstructed view, so the shape of the proposed apparatus 100 accommodates for this.

Figure 12:
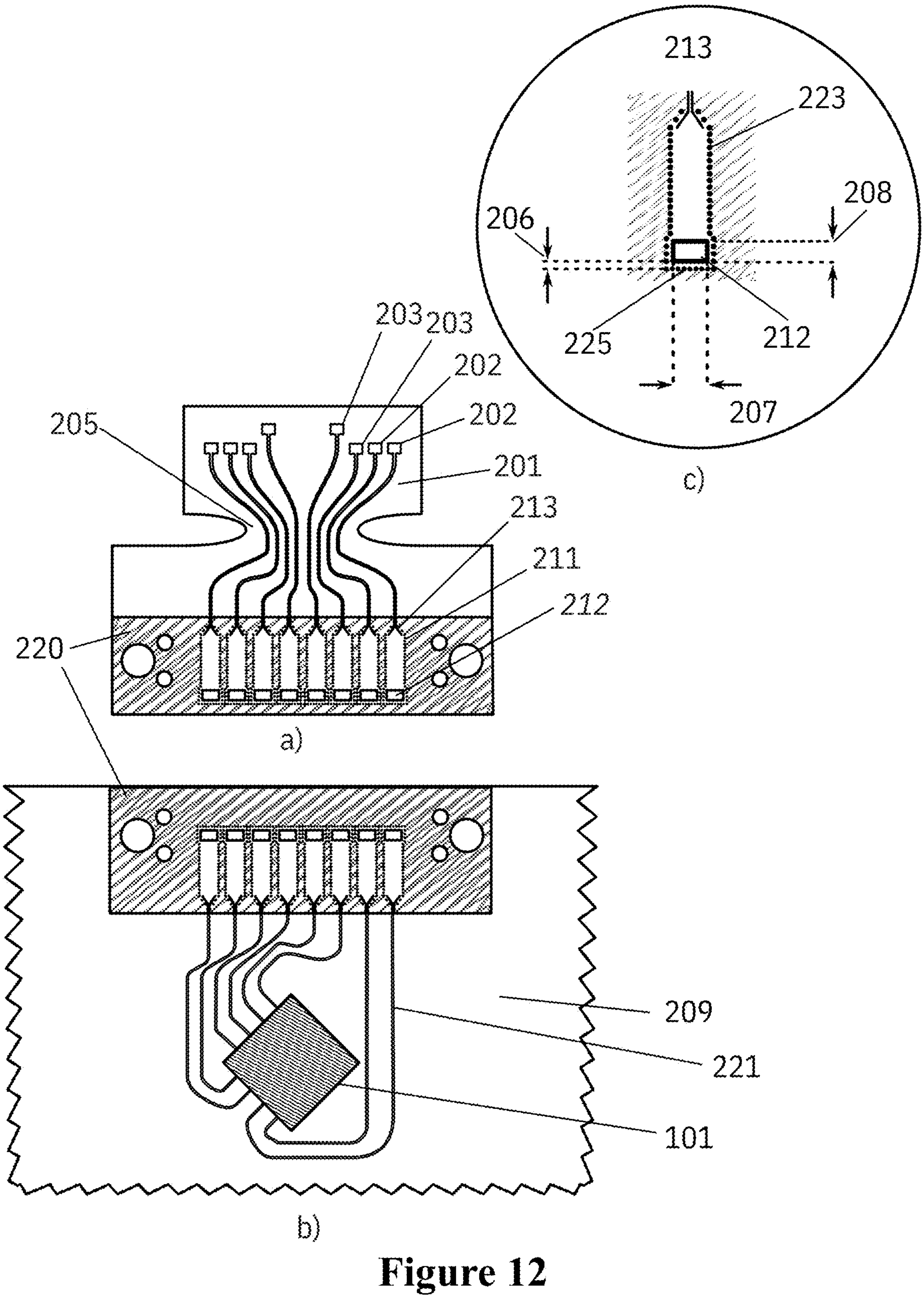
FIG. 12 shoes a bent substrate realization option with bent soft substrate and additional printed circuit board (PCB) and coupling structures.
Figure 13:
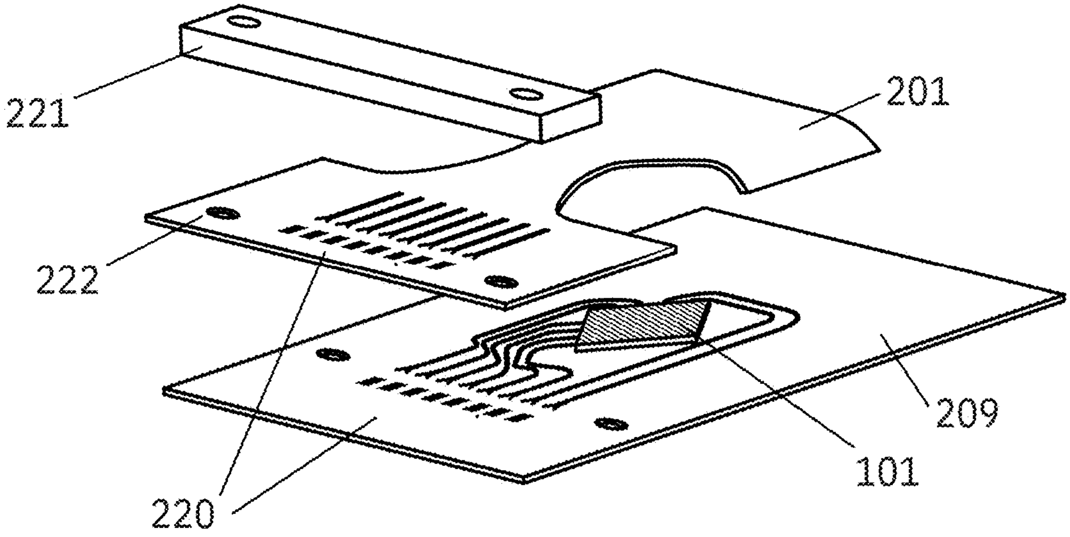
FIG. 13 shows setting arrangement options of the soft substrate and ridged substrate with signal coupling structure realization option an mechanical alignment realization option.

If this substrate PCB approach of the FIG. 11 b) cannot be easily manufactured with a high enough yield to enable low-cost production, the alternative way with coupling structures 22) is shown in FIG. 12. FIG. 12 shows a different realization option approach within the proposed apparatus 100. In this arrangement, there are two separate substrates: soft dielectric substrate 201, having bent antenna systems, and a separate rigid substrate 209 hosting the mmWave radar chip 101. The coupling of the electromagnetic millimeter waves is solved by an advantageously introduced coupling structure 220. Coupling structures 220 are placed one above the other as shown in FIG. 13. Such coupling structures enable the transmission of the mmWave signals from mmWave chip 101 to the transmitting antenna systems 203, and from the receiving antenna systems 202 to the mmWave chip 101. The coupling structure is specially constructed to enable wide band matching of the coupling in more than 10% of the central frequency operating frequency, with strong realization tolerance resilience. The loss in the coupling is less than 2 dB, typically 1 dB, which is a good compromise, enabling a more compact realization of the proposed apparatus 100.

In FIG. 12 c), details of the coupling structure 220 for one half of the transition are shown. In this arrangement, antenna systems (203, 202 are fed by a microstrip line on soft dielectric substrate 201, and this microstrip line is transformed to the grounded coplanar waveguide 213. Edges of the grounded coplanar waveguide 213 are widened in an arbitrary form, put gradually from the current mode strip to the dielectric waveguide 224 propagation mode. Embedded micro-vias 223 are placed onto the dielectric waveguide guiding structure 224.

On the top of the soft dielectric substrate 201, in the middle of the generated dielectric waveguide structure, a rectangular metallic slot structure 216 is built, having a specific lateral distance 207, specific length 208, and specific distance to the micro-vias, presenting a dielectric waveguide 225 short cut. Dimensions 207, 208 and 206 are specially electromagnetically optimized to ensure broad electromagnetic matching to the identical slot and identical coupling structure put on the top of the said slot 226, as shown in the FIG. 13. In FIG. 16, the plastic structure 221, as one of the realization options, may be used to press the soft substrate 201, containing the printed antenna systems, to the ridged substrate 209, containing mmWave chip 101. Holes in both substrates 201 and 209, 216, are introduced to ensure mechanical alignment of the two substrates, enabling good electrical coupling through the lower slot 225 and upper slot 225 of the two substrates, respectively. In both FIG. 12 and FIG. 13, the microstrip feeding lines are coming from mmWave chip 101 to the antenna systems 202 and 203 in such a way that the signal phase of the signal remains the same, which practically means that the length of the feeding microstrip lines must be the same, which in turn influences their positioning.

Figure 14:
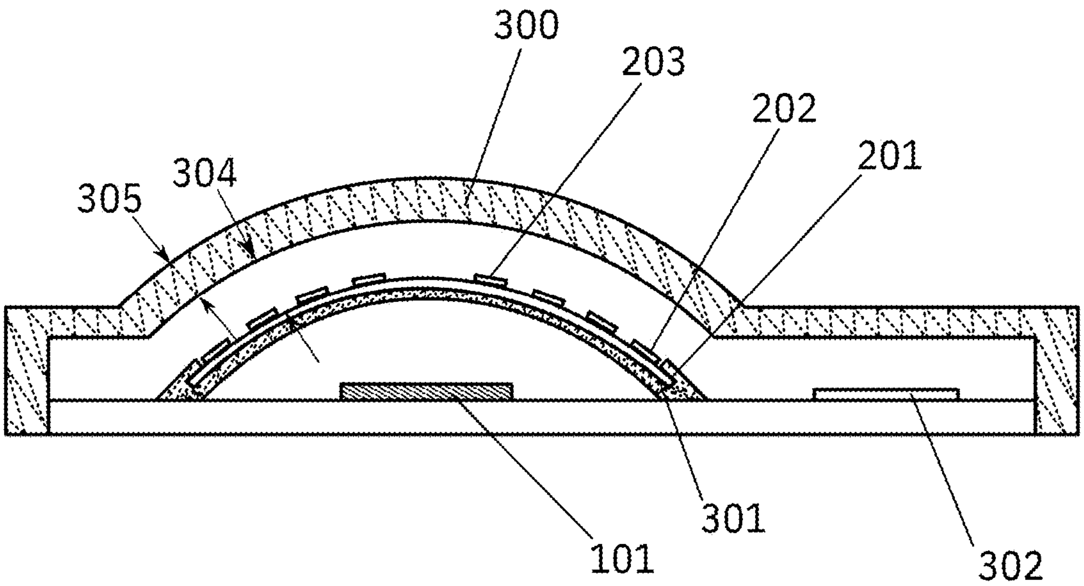
FIG. 14 shows a plastic mechanical structure for radome and mechanical fixture for connecting two substrates.

FIG. 14 shows parts of the proposed apparatus 100. This plastic structure 304 is forcing the substrate 201 to bend. In order to minimize the production cost, the same structure can be connected to the radome 300, which has a thickness 305 advantageously about one half of the central wavelength of apparatus 100 operation, and the distance 304 about one quarter of the said wavelength. In the arrangement of the FIG. 13 and FIG. 14, the mmWave chip 101 is physically below the antenna systems, and in the arrangement of the FIG. 11.

Figure 15:
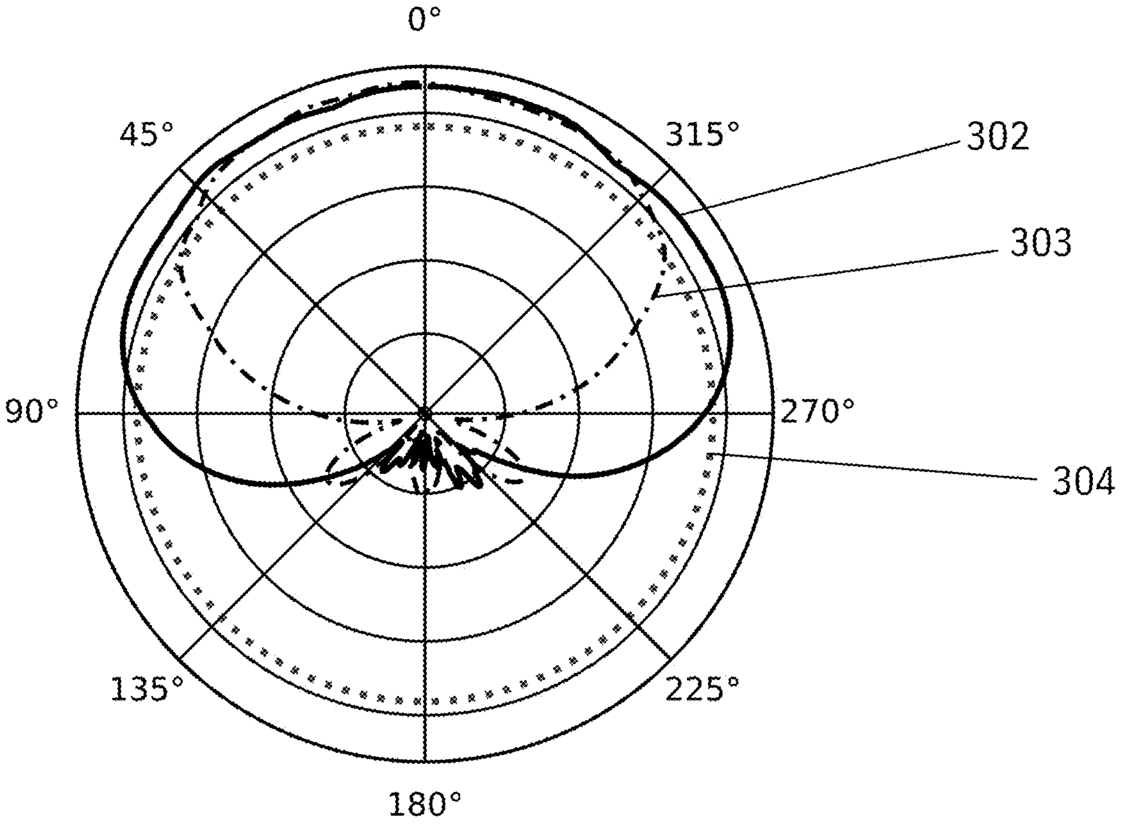
FIG. 15 shows a simulated radiation pattern in azimuth with state-of-the-art proposed apparatus (100) approaches.

FIG. 15. is showing a simulated radiation pattern in azimuth state-of-the-art 402 FIG. 16*a*) field of view and proposed apparatus 100 simulated radiation pattern in azimuth FIG. 16 b). In both diagrams, the dashed line is showing 6 dB border 403 for field of view (FoV). It is obvious that the proposed apparatus 100 has a 180° foV, and the state-of-the-art is smaller, in the 120 to 150° range. The essential advantage of the proposed apparatus 100 is that a large FoV can be realized using a single mmWave chip 101.

FIG. 16 shows one of the possible realization options for a complete mechanical outlook of the proposed apparatus 100. The possible size of a 180° foV radar sensor can be from 80 mm to 50 mm, with a thickness of 20 mm. The size of the system is dependent on the antenna system used, and if the printed antenna systems 202 and 203 have more radiation elements, which achieve larger detection ranges.

The proposed apparatus 100 has the optional feature of transmitting wireless signals, taking advantage of non-licensed and/or ISM frequency bands, to send alerts to the rider, the rider's airbag or the rear-view mirror/cluster display of the vehicle, for operation scenarios described in FIG. 3 and FIG. 2. This option requires the existence of a wireless communication chip and communication antenna systems, both being realized in several of the realization options. The wireless antenna can be realized as a SMD block placed on the substrate, close to the outside radome of the proposed apparatus 100, or as a printed antenna in the same position.

Figure 17:
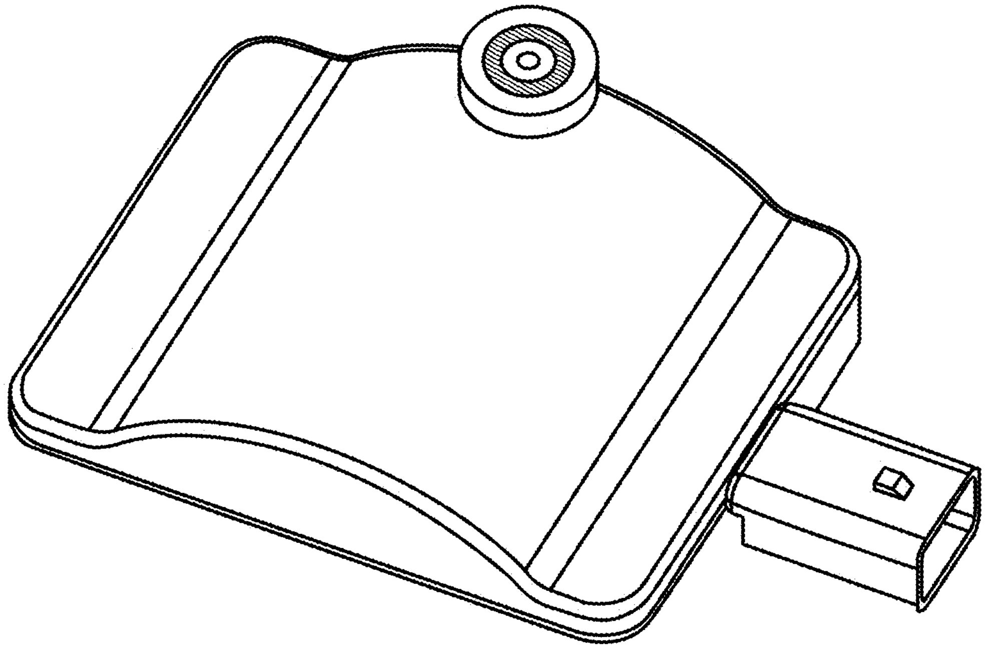

FIG. 17 shows one of the possible realization options for a complete mechanical outlook of the proposed apparatus (100) with an integrated camera. The camera, in this implementation option, is positioned at the top middle part of the apparatus' 100 housing, where the related integration place can be found. The camera's information output is provided for assessment over the same connector as the information coming from the radar, or over the wireless interface integrated in the apparatus 100. Video information can be then combined with radar sensor alerts, or triggered by the radar sensor alerts, transmitted to the vehicle cluster and/or to the infotainment system display, and/or to the display integrated into the rear-view mirrors, and/or or in the display integrated into the rider's helmet for two-wheeler vehicles. For the wired transmission, the video signal can be packed with compression over the existing CAN bus, to maintain the lowest possible system cost for a sufficiently good level of information, leading to more comfort.

Further aspects and examples are found in the following numbered clauses:

Clause 1: apparatus working as MmWave radar sensor module comprising:

a mmWave integrated radar circuit entity havingat least four receiving input, and at least two transmitting outputs;

an antenna structure having at least four radiation elements receiving mmWave signals, and at least two radiation elements transmitting mmWave signals, all the radiation elements being connected by mmWave electromagnetic transmission guides to the integrated mmWave integrated radar circuit entity, wherein the middle points of radiation surfaces of said radiation elements build a symmetrical convex arrangement toward observation area, named the main curve, wherein said radiation elements transmitting mmWave signals are arranged on the main curve in the middle of the main curve in symmetrical order such that the same number of radiation elements transmitting mmWave signals are arranged on each side of the "main curve", if the number of radiation elements transmitting mmWave signals is even and one radiation element transmitting mmWave signals is arranged in the middle of the main curve and rest of the radiation elements transmitting mmWave signals are symmetrically arranged on each side of the main curve, if the number of the radiation elements transmitting mmWave signals are odd.

wherein said radiation elements receiving mmWave signals are arranged on the main curve on the left and right side of the radiation elements transmitting mmWave signals.

Clause 2: apparatus according to clause 1, wherein the portion of middle points of radiation surfaces of the said radiation elements are building symmetrical convex arrangement toward observation area, named main curve wherein said radiation elements portion transmitting mmWave signals are arranged on the main curve in the middle of the main curve in symmetrical order such that one radiation element transmitting mmWave signals the same number of each side of the main curve, if the number of portions of the said radiation elements transmitting mmWave signals is even, and one radiation elements transmitting mmWave signals in the middle of the main curve and rest radiation elements transmitting mmWave signals symmetrical, if the number of portions of the radiation elements transmitting mmWave signals are odd.

wherein said radiation elements receiving mmWave signals are arranged on the main curve on the left and right side of the radiation elements transmitting mmWave signals and wherein said radiation elements second portion transmitting mmWave signals are arranged on a secondary curve in the middle of the secondary curve in symmetrical order such that one radiation element transmitting mmWave signals the same number of each side of the secondary curve, if radiation elements second portion transmitting mmWave signals is even, and one radiation elements transmitting mmWave signals in the middle of the main curve and rest radiation elements transmitting mmWave signals symmetrical, if radiation elements second portion transmitting mmWave signals are odd, wherein said radiation elements receiving mmWave signals are arranged on the main curve on the left and right side of the radiation elements transmitting mmWave signals, wherein the secondary curve is displaced on the plane, which is parallel to "main curve" plane.

Clause 3: apparatus according to clause 2 wherein portion of said radiation elements receiving mmWave signals are arranged on a tertial curve in symmetrically manner, which is parallel to main curve plane.

Clause 4: apparatus according to any one of clauses 1 to 3, wherein the radiation elements transmitting mmWave signals are strings of patch antennas, wherein the minimum number of patches is one, and wherein mmWave electromagnetic transmission guides are microstrip lines.

Clause 5: apparatus according to any one of clauses 1 to 3, wherein the radiation elements transmitting mmWave signals are strings containing patches being printed on different sides of a microstrip feeding line in an asymmetrical manner with differing patch sizes, where mmWave electromagnetic transmission guides are microstrip lines.

Clause 6: apparatus according to any one of clauses 1 to 3, wherein radiation elements transmitting mmWave signals are open mmWave waveguides, wherein mmWave electromagnetic transmission guides are mmWave wave, guides, smoothly banded to reach their endings in one plane, where their endings are open mmWave waveguides, where open waveguides on both sides are rectangular mmWave waveguides.

Clause 7: apparatus according to clause 6, wherein open waveguides on both sides are ellipsoidal mmWave waveguides.

Clause 8: apparatus according to clause 6, wherein the mmWave integrated radar circuit entity's inputs and outputs are attached to the mmWave launcher, releasing mmWave radio signal coupling in the efficient way from and to mmWave integrated radar circuit entity inputs and outputs to the said mmWave waveguides.

Clause 9: apparatus according to clause 8, wherein mmWave launcher is an arbitrarily shaped planar patch.

Clause 10: apparatus according to any one of the preceding clauses, wherein said apparatus is placed with the minimum angle of zero degree from the plane of symmetrical main curve to horizontal plane parallel to the ground, toward the ground plane, mounted on the vehicle.

Clause 11: apparatus according to clause 10, wherein the vehicle, has more than one wheel.

Clause 12: apparatus according to clause 11, where the said vehicle, has more than one said apparatus mounted on more than one side of the vehicle.

Clause 13: apparatus according to any one of the preceding clauses, where the said apparatus can provide signal processing on module enabling detection of distance to targets, their speed, angular position relative to said apparatus, in the 180° azimuth field of view.

Clause 14: apparatus according to clause 13, where the said apparatus can provide classification of targets in the 180° azimuth field of view.

Clause 15: apparatus according to clause 13, where the said apparatus can provide tracking of targets.

Clause 16: apparatus according to any one of the preceding clauses, where in the same body of the said apparatus, the camera is integrated.

Clause 17: apparatus according to clause 16, where only one physical connection for both said apparatus and camera is approaching the vehicle infrastructure.

Clause 18: apparatus according to any one of the preceding clauses, where the said apparatus has integrated short range wireless communication means integrated circuit, enabling sensor information transmission wirelessly to the part of the vehicle body.

Clause 19: apparatus according to clause 18, where the sensor information is additionally transmitted to the two-wheeler rider's helmet.

Clause 20: apparatus according to clause 18, wherein the sensor information is additionally transmitted to the two-wheeler rider's airbag.

Clause 21: apparatus according to clause 18, wherein the sensor information is transmitted to the two-wheelers' back looking mirrors.

Clause 22: apparatus according to clause 19, wherein apparatus is mounted in after-market manner to the vehicle having only wireless communication means to the vehicle structure, without other wired digital interfaces.

The invention claimed is:

1. An apparatus working as an MmWave radar sensor module comprising:

a mmWave integrated radar circuit entity having at least four receiving inputs, and at least two transmitting outputs; and an antenna structure having at least four radiation elements receiving mmWave signals, and at least two radiation elements transmitting mmWave signals, all the radiation elements being connected by mmWave electromagnetic transmission guides to the mmWave integrated radar circuit entity, wherein the middle points of radiation surfaces of said radiation elements build a symmetrical convex arrangement toward an observation area that is the main curve, wherein said radiation elements transmitting mmWave signals are arranged on the main curve in the middle of the main curve in symmetrical order such that the same number of radiation elements transmitting mmWave signals are arranged on each side of the main curve, in a case in which the number of radiation elements transmitting mmWave signals is even and one radiation element transmitting mmWave signals is arranged in the middle of the main curve and remaining radiation elements transmitting mmWave signals are symmetrically arranged on each side of the main curve, in a case in which the number of the radiation elements transmitting mmWave signals are odd, wherein said radiation elements receiving mmWave signals are arranged on the main curve on the left and right side of the radiation elements transmitting mmWave signals, wherein a first set of said radiation elements transmitting mmWave signals are arranged on the main curve in the middle of the main curve in symmetrical order such that one radiation element transmitting manWave signals of the same number is provided on each side of the main curve, in a case in which the number of portions of the radiation elements transmitting mmwave signals is even, and one radiation element transmitting mmWave signals is provided in the middle of the main curve and remaining radiation elements transmitting mmWave signals are provided symmetrically, in a case in which the number of portions of the radiation elements transmitting mmWave signals are odd, wherein said radiation elements receiving mmWave signals are arranged on the main curve on the left and right sides of the radiation elements transmitting mmWave signals, wherein a second set of said radiation elements transmitting mmWave signals are arranged on a secondary curve in the middle of the secondary curve in symmetrical order such that one radiation element transmitting mmWave signals of the same number is provided on each side the secondary curve, in case in which the second portions of the radiation elements transmitting mmWave signals is even, and one radiation element transmitting mmWave signals is provided in the middle of the main curve and remaining radiation elements transmitting mmWave signals are provided symmetrically, in a case in which the second portions of the radiation elements transmitting mmWave signals are odd, wherein said radiation elements receiving mmWave signals are arranged on the main curve on the left and right sides of the radiation elements transmitting mmWave signals, and wherein the secondary curve is displaced on the plane, which is parallel to a plane of the main curve.

2. The apparatus according to claim 1, wherein a third set of said radiation elements receiving mmWave signals are arranged on a tertial curve in symmetrically manner, which is parallel to the main curve plane.

3. The apparatus according to claim 1, wherein the radiation elements transmitting mmWave signals are strings of patch antennas, wherein the minimum number of patches is one, and wherein the mmWave electromagnetic transmission guides are microstrip lines.

4. The apparatus according to claim 1, wherein the radiation elements transmitting mmWave signals are strings containing patches printed on different sides of a microstrip feeding line in an asymmetrical manner with differing patch sizes, and the mmWave electromagnetic transmission guides are microstrip lines.

5. The apparatus according to claim 1, wherein radiation elements transmitting mmWave signals are open mmWave waveguides, wherein the mmWave electromagnetic transmission guides are mmWave wavequides, smoothly banded to reach endings thereof in one plane, the endings being open mmWave waveguides, the open waveguides on both sides being rectangular mmWave waveguides.

6. The apparatus according to claim 5, wherein the open waveguides on both sides are ellipsoidal mmWave waveguides.

7. The apparatus according to claim 5, wherein the inputs and the outputs of the mmWave integrated radar circuit entity are attached to an mmWave launcher, releasing mmWave radio signal coupling from and to the inputs and the outputs of the mmWave integrated radar circuit entity to the mmWave waveguides.

8. The apparatus according to claim 7, wherein the mmWave launcher is an arbitrarily shaped planar patch.

9. The apparatus according to claim 1, wherein said apparatus is placed with the minimum angle of zero degree from the plane of symmetrical main curve to horizontal plane parallel to the ground, toward the ground plane, mounted on the vehicle.

10. The apparatus according to claim 9, wherein the vehicle has more than one wheel.

11. The apparatus according to claim 10, wherein the vehicle has more than one said apparatus mounted on more than one side of the vehicle.

12. The apparatus according to claim 1, wherein the apparatus is configured to provide signal processing on module enabling detection of distance to targets, a speed, and an angular position relative to said apparatus, in the 180° azimuth field of view.

13. The apparatus according to claim 12, wherein apparatus is configured to provide classification of targets in the 180° azimuth field of view.

14. The apparatus according to claim 12, where the apparatus is configured to provide tracking of targets.

15. The apparatus according to claim 1, wherein a camera is integrated in the same body of the apparatus.

16. The apparatus according to claim 15, wherein only one physical connection for both said apparatus and the camera is approaching the vehicle infrastructure.

17. The apparatus according to claim 1, further comprising an integrated short range wireless communication integrated circuit enabling sensor information transmission wirelessly to the part of the vehicle body.

18. The apparatus according to claim 17, wherein the sensor information is additionally transmitted to a helmet of a two-wheeler rider.

19. The apparatus according to claim 17, wherein the sensor information is additionally transmitted to an airbag of a two-wheeler rider.

20. The apparatus according to claim 17, wherein the sensor information is transmitted to back looking mirrors of a two-wheeler.

21. The apparatus according to claim 18, wherein the apparatus is mounted in an after-market manner to the vehicle having only wireless communication system configured to wirelessly communicate to the vehicle structure, without other wired digital interfaces.

* * * * *